Sept. 9, 1969 R. M. LINZ ET AL 3,465,708

TUNING INDICATOR

Filed Jan. 2, 1968

INVENTORS
FREDERICK P. BEDNARCZUK
ROBERT M. LINZ

BY *William S. Wolfe*

ATTORNEY

United States Patent Office 3,465,708
Patented Sept. 9, 1969

3,465,708

TUNING INDICATOR

Robert M. Linz, New Hartford, N.Y., and Frederick P. Bednarczuk, Burbank, Calif., assignors to General Electric Company, a corporation of New York Filed Jan. 2, 1968, Ser. No. 694,940
Int. Cl. H03j 1/02
U.S. Cl. 116—124.1 7 Claims

ABSTRACT OF THE DISCLOSURE

A tuning indicator for apparatus such as a radio comprising a front plate having an aperture therein and a calibrated dial scale located adjacent the aperture and a tuning disc having contrasting regions on one face thereof so as to produce an indication line visible through the aperture. The disc is rotatably positioned behind the front plate with a portion of the disc protruding from the edge of the front plate so that the indication line may be manually moved along the scale with a vernier-like effect.

BACKGROUND OF THE INVENTION

The subject invention generally relates to the field of tuning indicators and, in particular, to tuning indicators for radios.

It is generally desirable to provide tuning indicators for radios which are simple to use, manufacture, and assemble while providing accurate, highly readable visual indication. In the past, tuning indicators have been developed of the so-called slide rule type. While such indicators have important functional advantages, they in general require large and cumbersome gear or cord-and-pulley arrangements. Such mechanisms are generally not suitable because of their size or cost for use in small radios. Thus, a common tuning arrangement for use in small radios is to have a tuning disc directly connected to the tuning capacitor. The tuning disc itself may be calibrated with suitable markings and numerals so that the operator may manually turn the disc either by contact with the face or the edge to align a stationary pointer with the desired number on the scale, or the tuning disc may be transparent having an indication line which is rotated until it reaches the desired position along a fixed scale. However, in all of these cases, it is difficult to finely tune the radio in that the indicator generally moves along the dial a substantially large distance for a relatively small movement of the tuning disc, unless some sort of complicated gearing arrangement is used.

SUMMARY OF THE INVENTION

Accordingly, it is an object of the subject invention to provide a simple, inexpensive tuning indicator which provides an accurate, easy to read indication.

It is a further object to provide a tuning indicator which has a vernier-like effect.

Another object is to provide an improved slide rule type tuning indicator particularly suitable for use in a small radio.

A still further object is to provide a tuning indicator which provides an easy to read indication for use with the various bands of a multiband radio.

The above-stated objects are fulfilled in the subject invention by providing a front plate having a window therein and a rotatably mounted tuning disc having contrasting portions on the face thereof to produce an indicating line on a face of the disc. The tuning disc is located behind and adjacent to the front plate so that the indicating line can be viewed through the window and moves along the scale of the tuning dial when the tuning disc is rotated. A portion of the tuning disc extends beyond the front plate for manipulation by an operator. The tuning dial scale may be located adjacent an edge of the window or may be located on a transparent strip (i.e., a crystal) overlying the window. Additionally, the subject invention may be used to provide a tuning dial for a plurality of different bands such as AM-FM or AM-FM-SW.

The subject matter which we regard as our invention is specifically pointed out and distinctly claimed in the concluding portion of the specification.

DESCRIPTION OF THE DRAWINGS

The subject invention, however, together with further objects and advantages thereof may best be understood by reference to the following description taken in connection with the accompanying drawing in which.

DESCRIPTION OF THE PREFERRED EMBODIMENT

Figure 1:
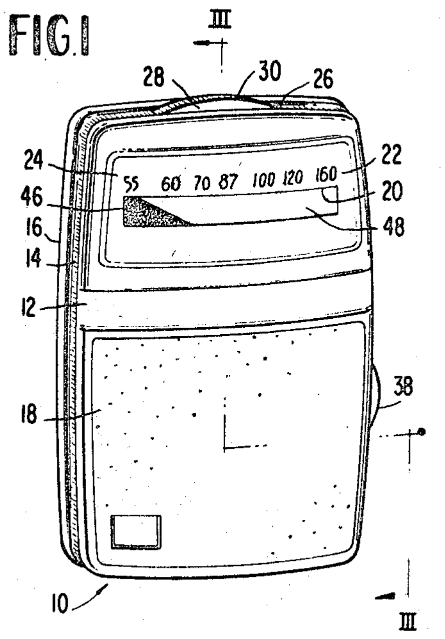
FIGURE 1 is a perspective view of a portable radio utilizing a tuning mechanism in accordance with the subject invention.

In FIGURE 1 a compact, portable radio 10 is shown which includes a tuning mechanism in accordance with the subject invention. The radio is basically comprised of a casing or cabinet having a front plate 12, a knurled median spacer 14 and a back plate 16. The front plate 12 has a lower perforated portion 18 through which sound from the speaker may be transmitted, and a substantially elongated, rectangular shaped window 20 in the upper portion thereof. Adjacent to an edge of the window 20 are suitable scale indicia 22 for tuning the radio to the desired frequency. A substantially transparent strip or crystal 24 may be positioned over the window 20.

An aperture 26 is provided in the top portion of the median spacer 14 through which a portion of a knurled tuning disc 28 extends. The edge 30 of the tuning disc extends a short distance above the top of the radio casing so that the edge can be conveniently contacted by the person operating the radio. The disc 28 is rotatably mounted adjacent the interior of the front plate 12 so that a portion of the disc 28 is visible through the window 20.

Figure 2:
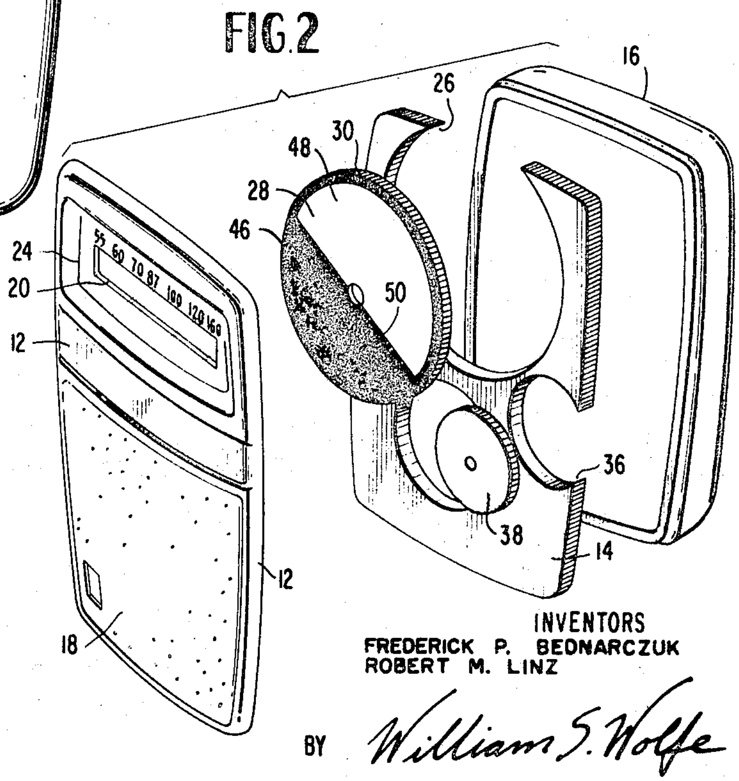
FIGURE 2 is an exploded view of portions of the radio shown in FIGURE 1.

As shown in FIGURE 2 an aperture 36 is provided in the side portion of the median strip 14 through which a portion of a volume control disc 38 extends in conventional fashion. The volume control disc 38 may act as both an on-off switch and a means for controlling the volume. This disc 38 extends a short distance past the side of the casing so that its edge may be conveniently rotated by one operating the radio.

Figure 3:
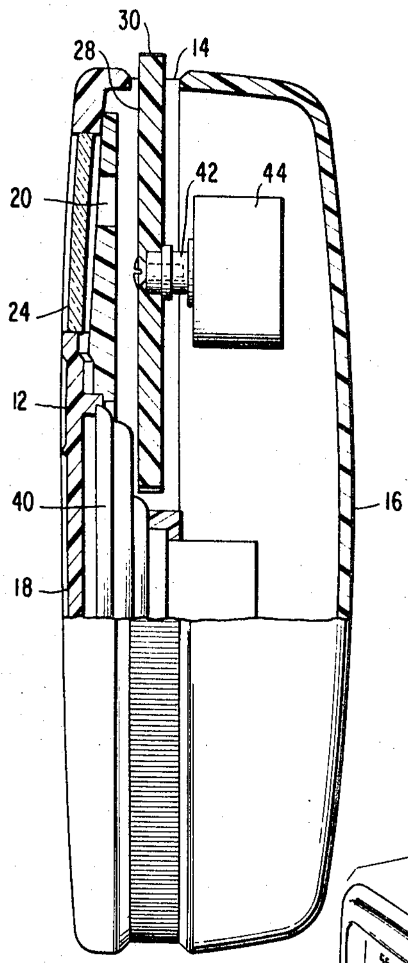
FIGURE 3 is a sectional view taken along the line III—III of FIGURE 1.

As shown in FIGURE 3, the radio 10 also includes a speaker 40 located adjacent the lower perforated portion 18 of the front plate 12. The tuning disc 28 is connected to a shaft 42 of a tuning capacitor 44. Therefore, when the tuning disc 28 is rotated, one element of the tuning capacitor 44 rotates relative to a second element so as to tune the radio receiver to a desired broadcast frequency in well-known fashion. Of course, the radio receiver circuitry and the associated battery, and antenna, which are not shown, are included within the radio casing.

As can be seen in FIGURES 1 and 2, the tuning disc 28 includes on one face two contrasting regions 46 and 48, the interface between the two regions defining an indication line 50. Thus, when the tuning disc 28 is rotated by engaging and moving the exposed portion of the outer edge 30, the indication line 50 when viewed from the front of the radio moves along the scale 22 on the edge of the window 20. The use of a disc having contrasting regions with an indication line defined therebetween provides a clear, simple, easy to read slide rule type indication of the station to which the radio is tuned while also providing a vernier-like effect. This vernier-like effect is accomplished by causing the indication line 50 visible through the window 20 to be at a smaller radius than the portion of the disc 28 that is moved by the operator (i.e., the outer edge 30). Therefore, movement of the outer edge of the disc a given distance causes the indication line 50 to move along the scale 22 a smaller distance. This effect is especially pronounced when the window 20 is of a substantially elongated linear shape and is positioned substantially perpendicular to a radius through the center of the window 20, as shown in FIGURE 1. This allows the radio to be finely tuned with ease without the need for complicated, bulky, and/or expensive mechanisms.

Although the embodiment shown is preferred, there are many possible modifications which come within the scope of the present invention.

The scale 22 may be placed along either of the longitudinal edges of the window or, if desired, may be imprinted on the crystal.

Also, the window 20 may be of any desired shape such as rectangular (as shown), annular or trapezoidal. Also, the window may extend vertically, at an angle, or horizontally (as shown) and may be placed anywhere on the radio body as long as the tuning disc is positioned in proper relationship therewith.

If desired, a tuning mechanism in accordance with the subject invention may be used for a multiband radio. In such a case, scale indicia may be placed adjacent both longitudinal edges of the window and/or on the associated crystal. Also, a plurality of windows might be used in a multiband radio.

Additionally, the contrasting regions on the front face of the tuning disc 28 may be of any desired configuration, including the substantially semi-circular shape shown in FIGURE 2. As an example, the indication line separating the contrasting regions may be curved, such as S-shaped, or may be a discontinuous straight line, not radially extending.

Also, the tuning disc may also be of any shape approximating a circle, such as polygon, or may be a substantial sector of such a shape.

Thus, the subject invention provides a slide rule type tuning mechanism which may be used in a device such as a radio which allows the tuning mechanism to be simple, compact, easy to use, clear and easy to read as well as inexpensive to manufacture and easy to assemble.

While particular embodiments of this invention have been shown and described, it will be obvious to those skilled in the art that various changes and modifications may be made without departing from this invention in its broader aspects and therefore, it is intended the appended claims cover all such changes and modifications as follows in the true spirit and scope of this invention.

What we claim as new and desire to secure by Letters Patent of the United States is:

1. In a radio receiver including a frequency selecting variable impedance, a tuning mechanism comprising:

(a) a casing structure having an elongated aperture therein and calibrated scale indicia positioned adjacent said aperture;

(b) a tuning disc operatively engaging the variable impedance and rotatably mounted adjacent the inside surface of said casing structure so that a portion of a front face of said disc is always visible through said aperture with an edge portion of said disc extending beyond the exterior of said casing structure; the front face of said disc having two contrasting regions, the interface of which forms an indication line extending along the front face of the disc so that when said disc is rotated, said indication line moves along the set of calibrated markings when viewed through said aperture.

2. A radio receiver as in claim 1 wherein said aperture in said casing structure is substantially linear in shape.

3. In a tuning indicator mechanism including a tuning knob and a casing structure having an aperture therein, the improvement comprising:

a set of calibrated scale indicia located adjacent an edge of the aperture;

said tuning knob being a disc which is rotatably mounted behind the aperture, an edge of which protrudes a short distance out from the exterior surface of said casing structure, said knob having a front face which is visible through said aperture and which has a region thereon contrasting with the remainder of the front face, an edge of the region forming an indication line;

whereupon when the tuning knob is rotated, the indication line moves along the scale indicia.

4. A tuning dial mechanism as in claim 3 wherein the scale indicia are located on said casing structure adjacent an elongated edge of said aperture.

5. A tuning dial mechanism as in claim 3 wherein said aperture is substantially rectangular in shape and said knob is substantially circular in shape.

6. A tuning dial mechanism as in claim 5 wherein the front face of said disc has one substantially semicircular zone thereon which contrasts with the remainder of the front face, an edge of said semicircular zone forming a substantially diametrically-extending indication line.

7. A slide rule type tuning indicator for a radio receiver cabinet having a frequency selecting variable impedance positioned therein, said indicator comprising;

(a) a tuning disc including contrasting regions on the face thereof defining an indication line therebetween, (b) said tuning disc being rotatably mounted in said cabinet in operative engagement with said variable impedance with a manipulative portion of said disc extending outside of said cabinet, (c) the cabinet including a viewing window overlying said disc intermediate said manipulative portion and the center of said disc.

References Cited

UNITED STATES PATENTS

| | | | |
|---|---|---|---|
| 1,699,283 | 1/1929 | Driggs | 116—124.3 |
| 1,990,639 | 2/1935 | Dewhurst | 116—124.4 |
| 2,062,603 | 12/1936 | Pagliari | 116—124.3 |
| 2,678,621 | 5/1954 | Proctor | 116—56 |
| 3,011,039 | 11/1961 | Siri. | |
| 3,227,128 | 1/1966 | Schmidt | 116—124.1 |
| 3,313,267 | 4/1967 | Casini | 116—116 |

FOREIGN PATENTS 670,520 11/1929 France.

LOUIS J. CAPOZI, Primary Examiner

U.S. Cl. X.R.

74—10.45; 325—361, 455; 334—86